Dec. 5, 1967     P. A. FREEMAN     3,355,942
MAN-CARRIED AUTO-NAVIGATION DEVICE
Filed May 14, 1965     7 Sheets-Sheet 1
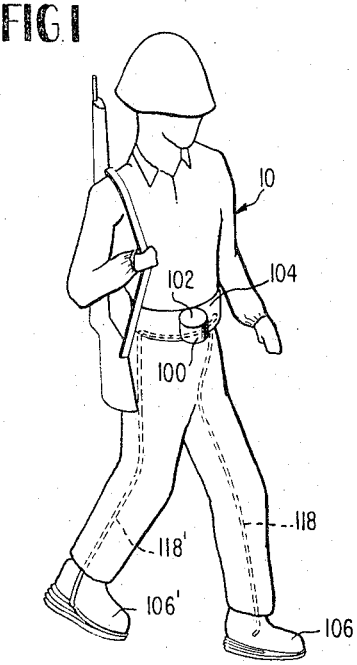
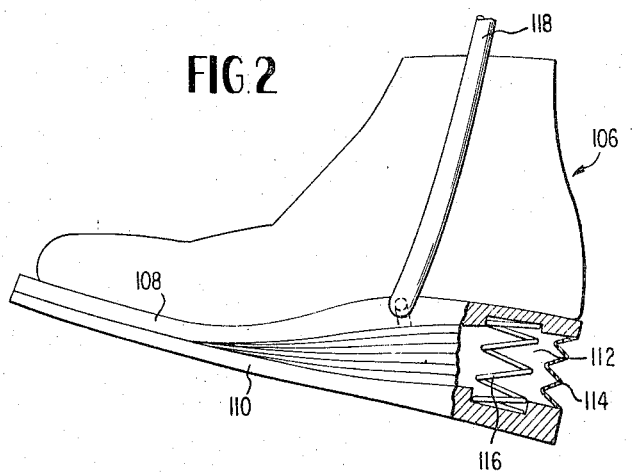
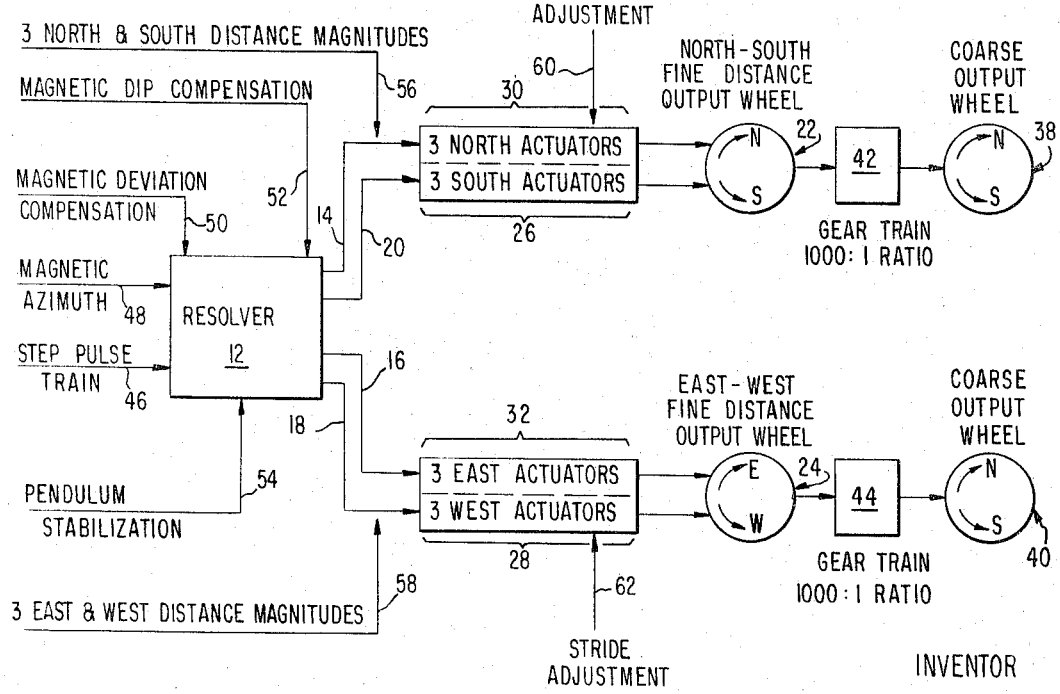
INVENTOR
PETER A. FREEMAN
BY
ATTORNEYS Dec. 5, 1967 P. A. FREEMAN 3,355,942
MAN-CARRIED AUTO-NAVIGATION DEVICE
Filed May 14, 1965 7 Sheets-Sheet 2

INVENTOR
PETER A. FREEMAN
BY ATTORNEYS

Dec. 5, 1967 P. A. FREEMAN 3,355,942
MAN-CARRIED AUTO-NAVIGATION DEVICE
Filed May 14, 1965 7 Sheets-Sheet 3

INVENTOR
PETER A. FREEMAN

BY ATTORNEYS

Dec. 5, 1967 P. A. FREEMAN 3,355,942
MAN-CARRIED AUTO-NAVIGATION DEVICE
Filed May 14, 1965 7 Sheets-Sheet 4

INVENTOR
PETER A. FREEMAN

BY Sughrue, Rothwell, Mion, Zinn & Macpeak
ATTORNEYS

Dec. 5, 1967   P. A. FREEMAN   3,355,942
MAN-CARRIED AUTO-NAVIGATION DEVICE
Filed May 14, 1965   7 Sheets-Sheet 5

INVENTOR
PETER A. FREEMAN

BY Sughrue, Rothwell, Mion,
Zinn & Macpeak
ATTORNEYS

Dec. 5, 1967 P. A. FREEMAN 3,355,942
MAN-CARRIED AUTO-NAVIGATION DEVICE
Filed May 14, 1965 7 Sheets-Sheet 6
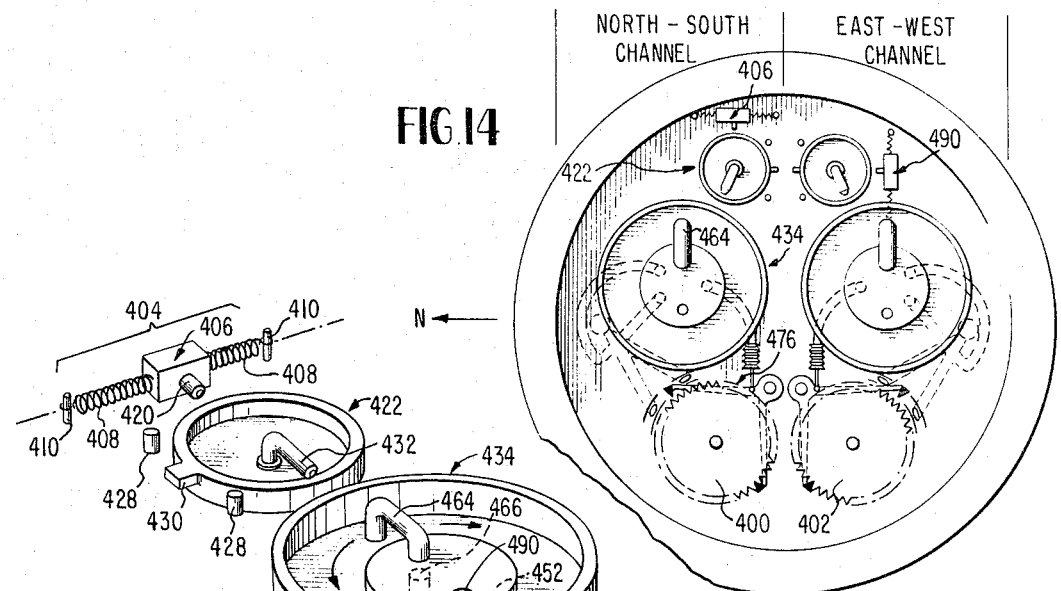
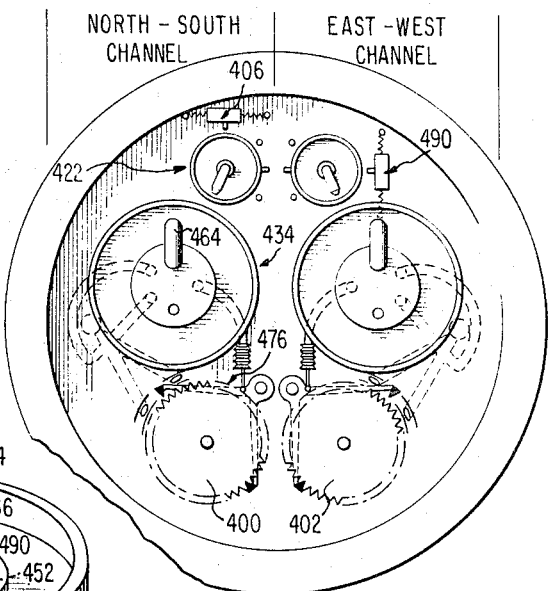
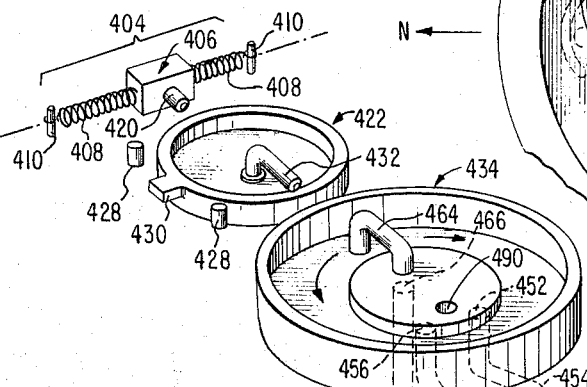
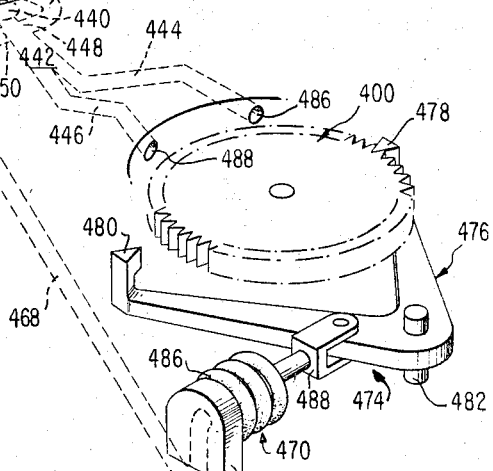
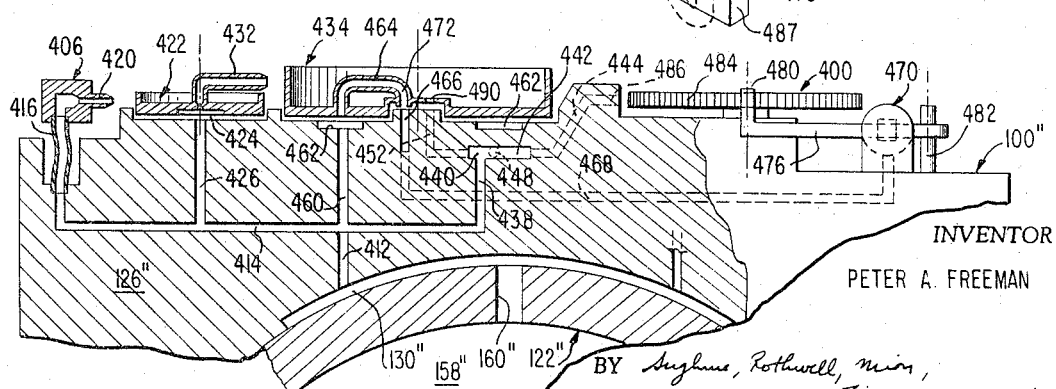
INVENTOR
PETER A. FREEMAN
ATTORNEYS

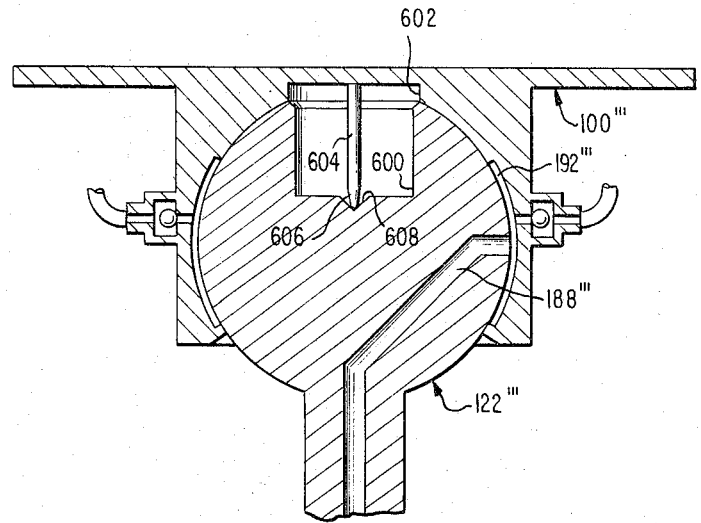
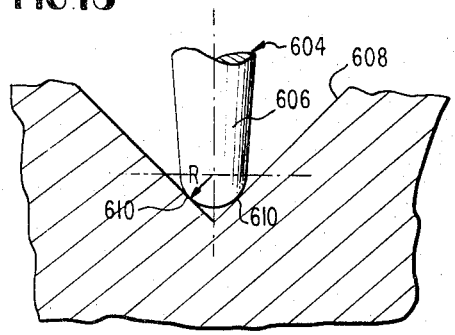
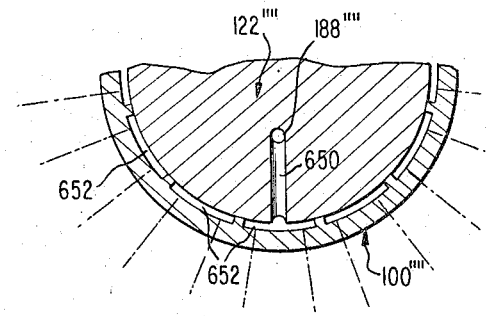
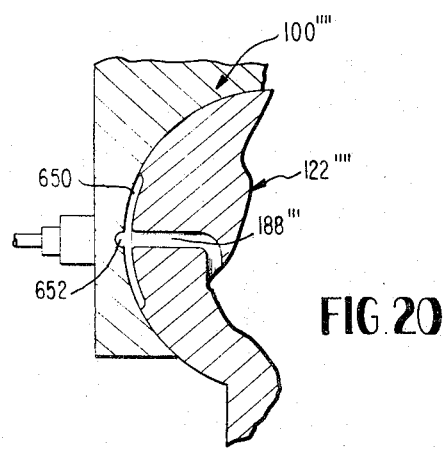
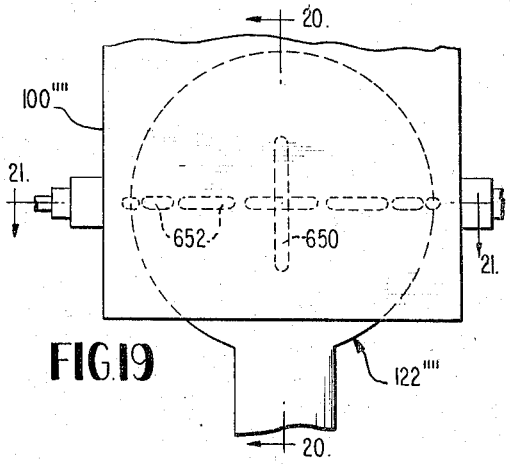

United States Patent Office 3,355,942
Patented Dec. 5, 1967

3,355,942
MAN-CARRIED AUTO-NAVIGATION DEVICE
Peter A. Freeman, Baltimore, Md., assignor to Martin-Marietta Corporation, New York, N.Y., a corporation of Maryland
Filed May 14, 1965, Ser. No. 455,804
37 Claims. (Cl. 73—178)

ABSTRACT OF THE DISCLOSURE

A magnetically oriented platform is mounted for rotation on a bearing type member which is continually oriented with the direction in which the carrier is faced. Air pressure generated by a bellows member in the carrier's shoe is utilized to effect an air bearing relationship between the platform and the bearing member and to produce a directionally oriented pulse force in the bearing member which selectively communicates with circumferentially spaced isolated chambers on the platform. North-south and east-west distance indicators, which are mounted on the platform, are each rotatable in varying degrees by a series of actuators spaced varying distances from their axes of rotation and connected to selectively receive pulse forces from the spaced isolated chambers. The specification should be consulted for further details of this and alternate embodiments.

---

This invention relates to a man-carried navigation device, and more particularly to a lightweight, completely mechanical, low energy device by which small units of men may locate themselves accurately with respect to some reference point when operating in the jungle, darkness or bad weather without dependence upon visual landmarks.

Man-carried navigation devices, for practical use, should be as automatic as possible with the user being required to do as little as possible of adjusting, manipulating, mental computing, compensating, etc., in order to obtain instrument accuracy of a few percent of the distance traveled. Since the devices must be used in extreme climates and under the most adverse weather conditions, the device must be unaffected by operational environments, such as temperature, humidity, dust, insects, fungus, etc. In order not to burden the carrier with the requirement of carrying a large power supply, or alternatively requiring the operator to provide, through normal ambulation, a large source of energy, the devices must operate on as little power as possible. Due to the climatic environmental factors, the device should preferably be non-electrical. Since batteries, which are the most reasonable source of portable electrical power, are relatively heavy for the amount of energy stored, they present serious logistic problems in terms of resupply, recharging, limited battery life, replacement of the electrolyte, etc.

It is, therefore, a primary object of this invention to provide a man-carried navigation device which is highly simple, practical and completely passive and which operates with an accuracy of about three percent of the distance traveled.

It is a further object of this invention to provide a man-carried navigation device which requires a minimum amount of adjustment, calibration and mental computing and which is extremely rugged and reliable.

It is a further object of this invention to provide a man-carried navigation device in which the power required to operate the device is provided by the user during normal ambulatory movement of the carrier.

It is a further object of this invention to provide a man-carried navigation device of this type characterized by minimum energy drain from the carrier and which, during use, does not inhibit normal body motion.

It is a further object of this invention to provide a man-carried navigation device which may be readily adopted as a completely passive navigation device for a mechanized vehicle, such as an automobile or a small power driven boat.

Another object of this invention is to provide a device, such as a man-carried navigation instrument, wherein digital vector sum inputs may be stored as integrated vector components.

It is a further object of this invention to provide an improved fluid resolver for use in a man-carried navigation device which receives a series of spaced fluid pulses.

It is a further object of this invention to provide an improved fluid resolver of this type which receives a fluid pulse input and directs the same selectively to a series of fluid actuators for driving a movable device in an integrated manner.

It is a further object of this invention to provide improved fluid actuators which may be used in conjunction with a fluid resolver within a man-carried navigation device, for incrementally indexing a movable member in response to fluid pulse input.

It is another object of this invention to provide a vector component energy pulse storage system including a fluid operated indexing member which is indexed incrementally in a predetermined direction in response to digital fluid pulse vector sum input.

The foregoing and other objects, features and advantages of the invention will be apparent from the following more particular description of preferred embodiments of the invention, as illustrated in the accompanying drawings.

In the drawings:
FIGURE 1 is a perspective view of a man carrying the navigation device of the present invention.
FIGURE 2 is a side elevation, partially in section, of a boot worn by the carrier in FIGURE 1 which acts to produce fluid energy pulses as a result of carrier ambulation.
FIGURE 3 is a schematic, block diagram view of the system components of a preferred embodiment of the man-carried navigation device of the present invention.
FIGURE 4 is a side elevation, partially in section, of one embodiment of the navigation device of the present invention.
FIGURE 5 is a top plan view, partially in section, of the device shown in FIGURE 4 with a portion of the elements cut away to show the fluid operated, distance indication actuators.
FIGURE 6 is a partial schematic view of the resolver forming a portion of the device shown in FIGURES 4 and 5.
FIGURE 7 is a plot of the sine and cosine curves indicating the relative amount of index imparted to the "North" and "East" distance indication wheels for various stride pulses.
FIGURE 8 is an enlarged, perspective view, partially in section, of the fluid actuators for indexing one of the distance indicating wheels including the cam operated means for stride adjustment.
FIGURE 9 is an elevation, partially in section, of one type of fluid actuator for producing constant stroke, pulsed wheel indexing.
FIGURE 10 is an elevation, in section, of a second embodiment of a fluid operated actuator for effecting a constant stroke index of the distance indicating wheel.
FIGURE 11 is a side elevation of the actuator shown in FIGURE 10 taken about lines 11—11.
FIGURE 12 is an elevation, in section, of a modification of the man-carried navigation device shown in FIG- URE 4 utilizing the type of actuator shown in FIGURES 10 and 11.

FIGURE 14 is a top plan view of yet another embodiment of the present invention.

FIGURE 15 is a perspective view of the elements forming the pulse drive mechanism for the North-South distance indicating wheel of the embodiment shown in FIGURE 14.

FIGURE 16 is a side elevation of the device shown in FIGURE 14, partially in section, showing the elements making up the pulse drive mechanism illustrated in FIGURE 15.

FIGURE 17 is an elevational view, in section, of yet another embodiment of the present invention in which the stabilized platform is supported by means of a conical spike on the spherical support member.

FIGURE 18 is an enlarged elevational view of a portion of the apparatus shown in FIGURE 17, showing in detail the line contact between the spike and the conical depression within the spherical member.

FIGURE 19 is an elevation of an alternate embodiment of the present invention which uses a modified fluid resolver.

FIGURE 20 is a partial elevational view, in section, taken along lines 20—20 of the apparatus shown in FIGURE 19.

FIGURE 21 is a plan elevational view of the apparatus shown in FIGURE 19 taken about lines 21—21 of FIGURE 19.

Figure 5:
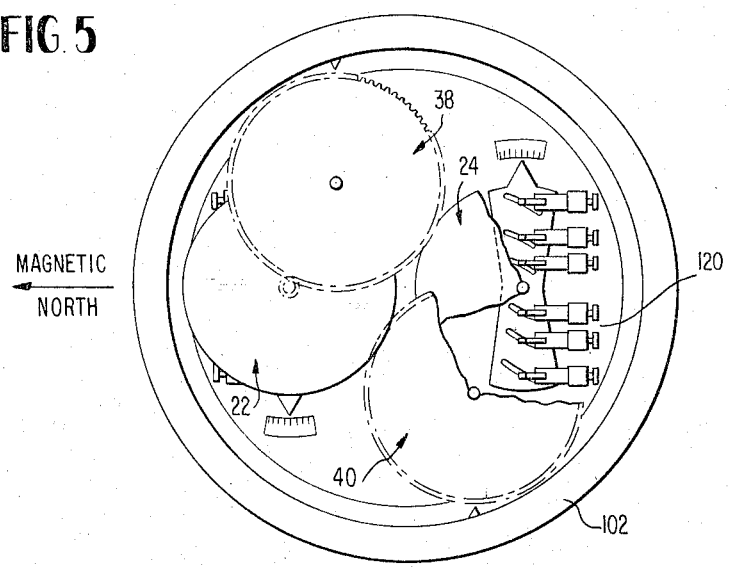

In general, this invention is directed to a pulse force operated navigation device consisting of a platform mounted for relative free movement about an axis perpendicular to the earth's magnetic field with means carried by the platform tending to align the platform with the earth's magnetic field. A distance indicating member is mounted on the platform for relative movement therewith. Means are provided, responsive to each pulse created as a result of movement of the navigation device in any direction from a reference point for incrementally moving the distance indicating member. The means are further provided responsive to the direction of movement of the device with respect to the magnetic field for modifying the extent of incremental movement.

In a preferred form, the system utilizes a platform mounted on an air bearing and a series of resolver chambers positioned circumferentially of the air bearing support and carried by the platform which are selectively coupled to a single pulse source of fluid, which source is directed in the direction of carrier movement. The pulses are selectively delivered to associated fluid driven actuators positioned at a radial distance from the axis of rotation of an indicator wheel and operatively connected thereto such that the wheels are angularly indexed, incrementally, a distance depending upon the extent of motion with respect to said magnetic reference field and the direction of motion thereto.

An alternative embodiment eliminates the resolver and uses an intertial mass mounted for oscillation about a reference axis which discharges fluid against the peripheral surface of a freely rotatable wheel to impart a torque to the wheel proportional to displacement of the inertial mass along said sensitive axis. A double integrated pneumatic fluid drive produces an end rotation of a second integrator wheel which is dependent upon the extent of movement of the carrier with respect to a reference point and his direction of movement with respect to said magnetic field. An incrementally driven distance indication wheel is periodically indexed one index position by cooperating escapement means and a fluid motor for each full revolution of said second integrating wheel. A fluid drive system involves a fluid bistable device as a polarity sensor. The individual system components have broad application to means whereby a digital vector sum input is separated into vector components and stored in an integrated manner.

In yet another embodiment, the gas bearing for frictionlessly supporting the stabilized platform is replaced with a low friction suspension system in which the platform is suspended on the point of a conical spike. The spike rests in a shallow conical depression carried by an associated support member. Further, the fluid resolver may consist of a series of circumferentially spaced and independently sealed, narrow equatorial depressions formed about the horizontal axis plane of the sperical recess within the stabilized platform, while the fluid pulse director pipe, at its exit, is enlarged into a shallow groove along the meridian in the center of each segment, in the order of plus or minus 30° from its equator.

Figure 4:
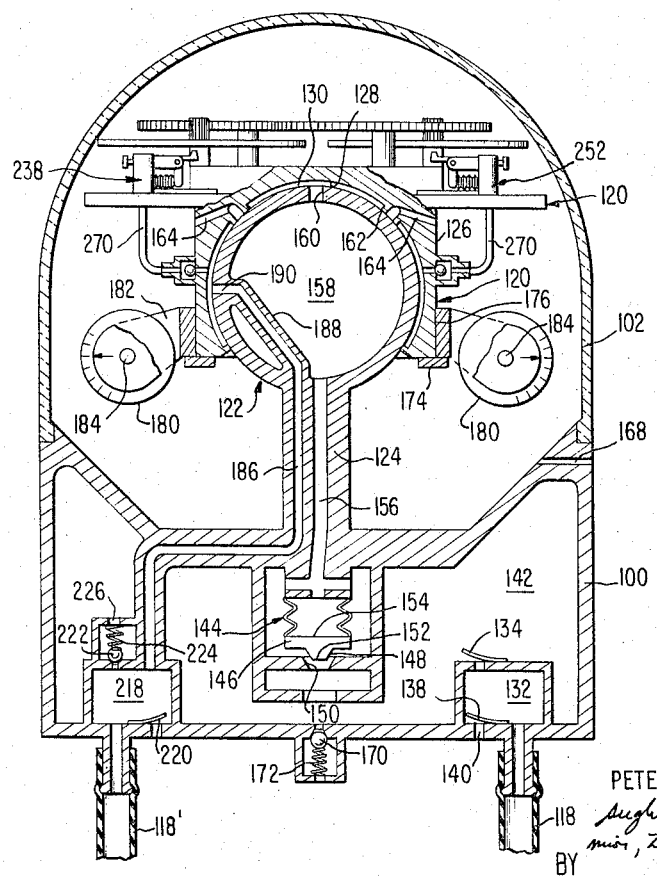

The man-carried pulse operated navigation device in the preferred form as shown in FIGURES 4 and 5 combines a pneumatic version of the well-proven pedometer, with a simple magnetically referenced, pneumatic resolver, and mechanically integrates the North and East distance components of each drive by angularly indexing "North" and "East" indicator wheels.

A functional block diagram of the instrument operation in the preferred form is shown in FIGURE 3. The integration process is digital or discontinuous in nature, in that indexing occurs only when a "step" pneumatic pulse is received; hence, integration errors cannot build up during periods when the man or carrier 10 is not walking, for instance, when the man is standing still, stationed, encamped, etc. Thus, satisfactory operation of the instrument depends upon the step pneumatic pulse principle and the instrument will not operate acceptably if it incorporates continuously running analog integration means. Further, no power is required by the integration process except that obtained from the indexing or "step" pulse.

The proposed resolver arrangement, in the preferred form, may be considered a pneumatic commutator in which each segment is maintained at its own heading angle with respect to North by magnets acting in the earth's magnetic field; and the commutator "wiper" or direction pipe is pointed in the direction of the man's progress. This is illustrated in FIGURE 3. Each segment of resolver 12 has two outputs indicated by lines 14 and 16, 18 or 20 to index the North-South distance output wheel 22 and to index the East-West distance output wheel 24. Note that South is considered a "minus North" and West is considered a "minus East" in this explanation. As such, the segments of the resolver include connecting lines 18 and 20 which are connected to the respective North and East wheels 22 and 24 by means of three South actuators 26 and three West actuators 28. The South actuators tend to rotate the North-South wheel 22 in a counterclockwise direction as shown, while the three North actuators tend to rotate the same wheel 22 in a clockwise direction. Further, three West actuators 28 tend to rotate the East-West distance wheel 24 counterclockwise while the East actuators 32, in subtractive manner, tend to rotate the same wheel 24 in a clockwise direction. The relative amount of index angle imparted to the North wheel by each commutator segment from a "step pulse" is varied according to the cosine of the average heading angle of that segment. Similarly, the relative amount of index angle imparted to the East wheel by a step pulse is varied according to the sine of the average heading angle of that segment.

Figure 7:
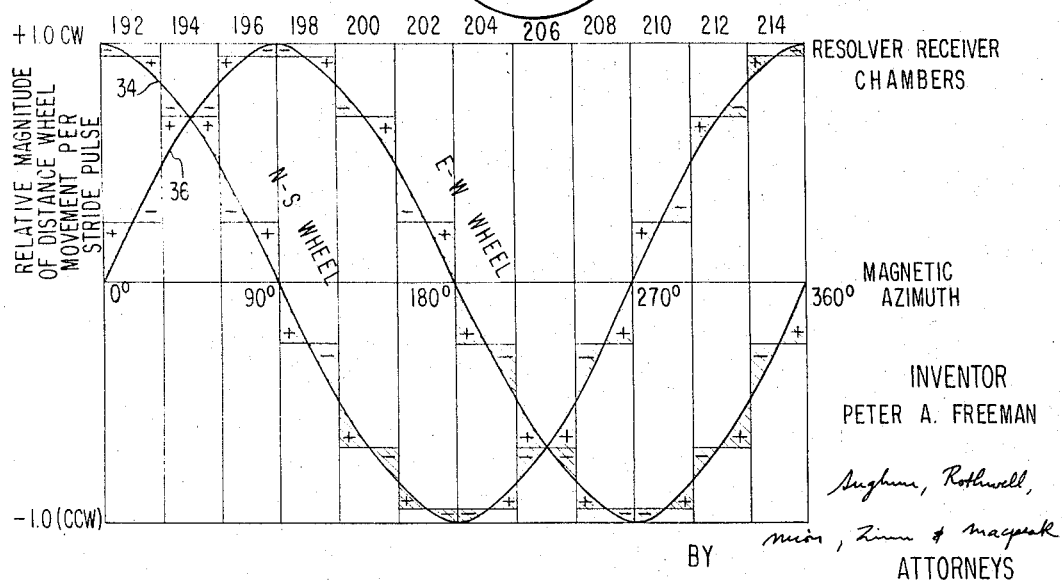

FIGURE 7 shows the relative index angle settings for a 12-segment commutator, together with the sine and cosine curves they approximate. The sine curve 36 represents the relative magnitude of distance wheel movement for the East-West wheel 24 per stride pulse directed to the East-West actuator. That is, depending upon which actuator is energized to produce its constant stroke output, its effect in moving the distance wheel about the wheel axis depends upon the relative radial positioning of the actuator with respect to the axis of rotation of the output wheel. In this manner, the angle of inclination of the navigation device with respect to the reference axis defined by the earth's magnetic field, during pulse production, is broken into the vector components which are fed to the respective North-South wheels 22 and East-West wheels 24 for proper indexing of the separate vector component distance indicating members. Likewise, the cosine curve 34 represents the relative magnitude of distance the wheel 22 rotates per stride pulse depending upon the angular position of pulse delivering means with respect to the reference axis position. It is proposed that a minimum number of segments be used in order to simplify the indexing arrangement; despite the fact that large deviations may occur between the average wheel index value in each segment and the corresponding sine or cosine curve. The extent of these deviations is shown by the shaded portions of FIGURE 7. It is believed that these deviations will not cause large errors in actual operation, since three conditions form the very favorable situation for a statistical averaging process: (a) the oscillatory nature of the magnetic North reference, (b) the random small changes in direction taken by the operator as he dodges and detours the hundreds of minor, local obstructions encountered on any extended cross-country walk, and (c) the very large number of steps (statistical sample) to be taken by the operator on any practical mission. In the block diagram of FIGURE 3, there are further provided, in addition to the fine distance output wheels 22 and 24, coarse output wheels 38 and 40 which are driven through appropriate gear trains 42 and 44 respectively. Depending, of course, upon the extent of normal use, larger or smaller reduction ratios may be necessary between the fine distance output wheels and the coarse distance output wheels.

In addition to providing, within the instrument, means for achieving the basic computation functions which have been described previously, a number of subsidiary functions must be mechanized for the proper operation of the instrument. Referring further to FIGURE 3, additional functional features are provided within the instrument. For instance, the azimuth resolution process for maximum accuracy must be accomplished in a horizontal plane. Thus, the plane of the segments of the resolver 12 must remain horizontally stabilized and the "wiper" or direction pipe should be aligned with the projected direction in the same horizontal plane and the man's motion vector. This may be accomplished by fitting the direction pipe to the instrument case, which is aligned to the man's body and hence, his motion direction. (Note that only direction is considered here, since the basic pedometer principle presumes that typical variations in vector magnitude for individual steps will satistically average out over a long time, and thus, may be calibrated with good accuracy.) Ideally, to accomplish this projection process, two additional resolutions must be added; to compensate for the man's forward or backward lean angle (pitch), and one to compensate for his lateral lean angle (roll). In actual practice, it is obvious that the man will sustain sufficient lateral lean angles for only a few seconds at a time, and that the left leans and right leans will almost completely average out as in the case of the resolver segment deviations. Consequently, it appears unnecessary to complicate the instrument with special compensation for lateral lean (roll).

As set forth previously, the instrument is predicated upon a production of step energy pulses; that is, each energy pulse is derived as a result of the carrier making one step of normal stride length during ambulant movement of the carrier. The step pulse input is indicated at 46 to resolver 12, FIGURE 3. One of the relatively rotatable elements of the resolver is maintained in a preferred reference position, in line with the earth's magnetic field, as indicated by magnetic azimuth input means 48. Since there is more or less deviation between the true geographic North and magnetic North, the device incorporates magnetic deviation compensation means, as indicated by input 50. Magnetic dip compensation, as indicated by line 52, is achieved by providing magnetic azimuth means, such as by permanent magnets, which are rotatable about a horizontal axis so as to facilitate orienting the North-South magnetic axis parallel to the local magnetic dip angle.

Since the resolver incorporates a member adapted to move freely about the orthogonal axes, there is required pendulum stabilization means as indicated by input arrow 54. For the respective actuators 26, 28, 30 and 32, means are provided for adjusting the stroke of each of the actuators, as indicated by input lines 56 and 58. Further, since the stride of each carrier may differ slightly, due to the physical size of the carrier, as well as the environmental conditions to which the carrier is subjected, stride adjustment means are provided in the device, as indicated by lines 60 and 62 which affect directly the relative position of the actuators with respect to the distance output wheels 22 and 24.

One practical embodiment based upon the system components and factor compensation means set forth in the block diagram of FIGURE 3 comprises the device shown in FIGURES 4, 5, 6, 7, 8 and 9. The device includes a cylindrical casing 100 preferably having a transparent dome 102. The device is shown attached to a belt 104 or like supporting means which is wrapped about the midwaist of carrier 10 without interferring with normal ambulatory movement. The instrument should be centered "over the carrier's navel" and should carry a forward alignment marker (not shown) on the top of the instrument case for precise alignment to man's forward progress vector. In this particular embodiment, the pulse operated device receives a fluid pulse as a result of normal walking or ambulatory movement of the carrier. That is, the carrier 10 is provided with boot 106 having two sole sections 108 and 110 which move relative to each other to vary the size of a cavity 112 formed therebetween and by a bellows connecting member means 114. A biasing spring 116 may be positioned so as to normally bias the sole sections 108 and 110 apart at the heel portion. Fluid connecting means allow, as a result of opening 120, a pneumatic pulse to flow from the boot 106 to the instrument casing 100 through line 118 of plastic, rubber, etc., associated with boot 106. A second line 118' associated with like boot 106' also operates in the same manner.

Reference to FIGURES 4 and 5 discloses the basic navigation device carried by belt 104. The operating principle in this embodiment is to combine the proven pedometer principle with a simple pneumatic resolver such that the components of North-South and East-West distances are separated and indicated directly by the instrument. The distance indicating mechanisms are mounted on a spherical gas bearing suspended table or platform 120, carried by a spherical base member 122 fixedly attached to the housing 100 by a hollow stem portion 124. Conventional gas bearing principles are utilized in the device and as such, the table or platform 120 includes a bottom section 126 having a central spherical recess 128 which overlies the upper surface of the spherical supporting member 122, but is spaced slightly therefrom to form a gas bearing cavity 130. In this respect, one of the fluid lines, such as 118, delivers to the bearing pressurized fluid through the double flap chamber 132. Chamber 132 includes respective flap valves 134 and 138 covering openings 136 connecting the valve chamber 132 to plenum chamber 142 or selectively controllling fluid communication between chamber 132 and the atmosphere via aperture 140. Thus, ambulatory motion produces "step" discharge of air into plenum chamber 142 through the valve means. The device is further provided with a pressure regulating valve indicated generally at 144, which includes a movable valve member 146 having a tapered, frusto-conical surface 148 which closes upon valve seat 150 to thereby provide, when closed, unequal surface areas 152 and 154 which are subjected to fluid pressure. With the area 152 being much smaller than the area 154, there is a natural tendency to maintain the pressure regulating valve 144 in closed position. The fluid within plenum chamber 142 passes by means of conduit 156 formed within the supporting stem 124 to the spherical plenum chamber 158 formed within the hollow, spherical gas bearing support 122. Opening 160 allows fluid communication to the air bearing cavity 130 with the fluid leaking past the seal areas 162 for discharge through conduit 164 to the chamber formed by the transparent cover 102. This chamber is in a fluid communication with the atmosphere through one or more openings 168 formed within the side wall of the main housing 100. In order to prevent excessive pressures being built up within the plenum chamber 142, a ball check valve 170 is provided within housing 100, the ball being normally biased in the valve closed position by spring-biasing means 172. The platform or table 120 is, therefore, supported for limited orthogonal movement about the spherical support member 122 by means of an almost frictionless layer of gas. Section 126 of the platform is provided at the bottom with a radial flange 174 which acts to support an annular ring member 176 carrying one or two permanent magnets 180 which are positioned 190° apart, in line with each other so as to orient the platform 120 and the elements supported thereby in a preferred reference position in line with the earth's magnetic field. The ring 176 includes radial bracket member 182 which is provided with magnet supporting rods 184 such that the magnets 180 may be rotatably adjusted about the vertical axis provided by rods 184 to align the North-South poles of the permanent magnets 180 with the magnetic field and to make angular changes about axis 184 to compensate for the magnetic field dip angle depending upon the World geographical position of the carrier. Compensation for angular deviation of magnetic North from geographic North is accomplished by rotating the ring 176 relative to the table 120.

The spherical gas bearing, suspended table or platform 120 is stabilized vertically by slight pendulosity. This may be achieved by the use of the same means for suspending the earth's magnetic field orientation means; that is, the permanent magnets 180 may provide the dual function of maintaining the platform 120 oriented in azimuth and stabilizing the table vertically. In any case, vertical stabilization is achieved by means in which the center of gravity of the table and its associated equipment is slightly below the axis of the spherical support means 122. By using the compound pendulum principle with the center of gravity just below the center of rotation of the mass about the spherical base, the natural frequency of oscillation of the mass is quite low. Further, by varying the coercive force of the magnets 180, the period of magnetic oscillation may be varied. A low period of magnetic oscillation in the order of 20 to 25 seconds is desirable for the type of system shown. In addition to the frequency of oscillation of the pendulous mass, the frequency of oscillation as a result of the mass tending to maintain its angular position oriented with the earth's magnetic field, the normal motion of the carrier in walking is within certain frequency limits. For best results, it is desirous to maintain these frequencies substantially different from each other, so that their effects are non-cumulative or they may substantially affect the accuracy of instrument operation.

Platform section 126 and the spherical supporting element 122 provide another highly important function for the navigation device. The stem section 124 of support member 122 includes a second longitudinally extending fluid carrying conduit 186 which has a tube or resolver director pipe 188 passing through a portion of the inner plenum chamber 158, which terminates in line with the horizontal axis of the spherical support member to form a discharge port or opening 190, the discharge being directed radially along the horizontal axis when the instrument is in its normal position. Cooperating therewith is a series of resolver-receiver chambers formed within the spherical recessed section 126 of platform 120, the chambers being fluid isolated and spaced circumferentially about the vertical axis of platform member 120. By reference to FIGURE 6, the positioning of the spaced resolver-receiver chambers circumferentially of the platform section 126 may be best appreciated. As shown, the chambers 192 through 214 extend circumferentially of member 126 and are fluid isolated by means of the fluid baffle sections or seals 216 which contact the outer surface of the spherical support member 132. Each quadrant is, therefore, provided with three resolver-receiver chambers and selective fluid communication is achieved between the nozzle 190 and one of the resolver-receiver chambers, such as 214 in FIGURE 6. The fluid connection to the particular resolver-receiver chamber is determined purely by the direction in which the carrier is moving with respect to the earth's magnetic field. Thus, the base of the spherical air bearing is modified to form a "stepwise" pneumatic resolver.

The arrangement shown uses three resolver chambers per quadrant, each of which moves an associated distance wheel a different amount. As indicated previously, the relative movement levels between actuators are established as shown in FIGURE 7 in which the average value of the theoretical resolution curve (sine and cosine functions) in each 30° segment is used throughout the segment. The errors involved on a proposed basis are shown by the shaded areas of FIGURE 7. While it is obvious that the level of positioning errors is relatively high at each end of the 30° segment, it is expected that these errors will be largely averaged out because of the wide and frequent variations in the direction a carrier will follow in typical field usage, and the expected oscillatory nature of magnetic alignment of the platform. Obviously, a greater degree of accuracy may be obtained by subdividing each quadrant into a greater number of equal segments at the penalty of a corresponding increase in the number of interconnections and fluid actuators for driving the distance indicating means.

Figure 6:
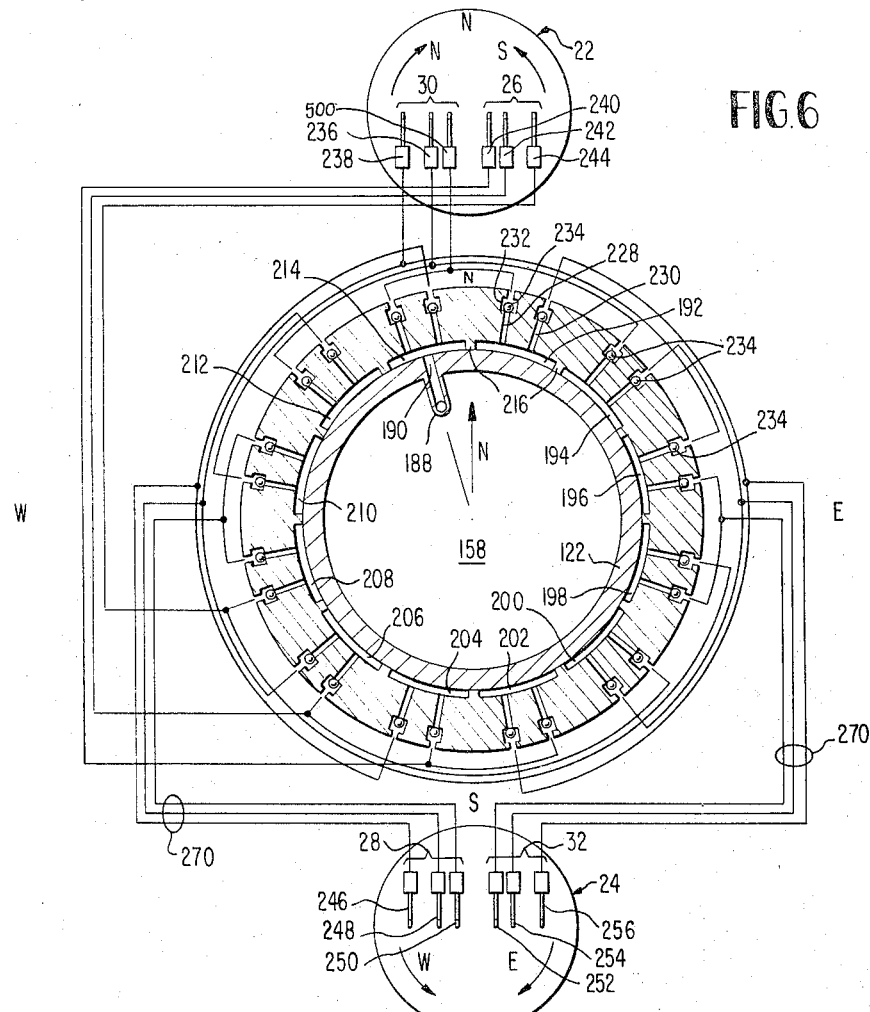

Referring back to FIGURE 4, it is seen that fluid conduit 186 is coupled to the second fluid supply tube 118′, for instance, through a valve chamber 218. Chamber 218 incorporates a flapper valve 220 which opens to the atmosphere during the suction portion of the bellows operation of boot 106′. In order to prevent excessive pressure from being generated within the resolver and its associated sections, a spring-biased pressure release valve of the ball check type is provided at 222, the ball being spring-biased by compression spring 224. Upon opening of the valve 222, the excessive pressure is relieved and the fluid passes through opening 226 into the base plenum chamber 142. The resolver-receiver chambers extend vertically from the horizontal through an arc of approximately 30° in either direction; thus, ensuring proper operation of the device even though the table may oscillate between extremes of 60°. This angle, of course, may be increased to perhaps a total oscillation angle of 90°. However, it is apparent that excessive tilting of the table with respect to its normal position in vertical alignment with the axis of the spherical support member will cause mechanical contact between the pendulum elements or the magnetic azimuth orientation means and the air bearing stem. Thus, there is some freedom of the table to oscillate and still make proper fluid connection between the resolver director pipe 188 and an associated resolver-receiver chamber. Each resolver chamber, such as chamber 192, includes a pair of fluid connecting ports 228 and 230 which are provided with enlarged sections 232 for receiving ball check valves 234 to allow the discharge of fluid from the resolver director pipe 188 to pass through the resolver-receiver chamber to the pneumatic fluid operated actuators associated with the respective North-South distance indicating means or the East-West distance indicating means. However, the balls 234 prevent fluid from passing in the opposite direction. The ball check valves are normally biased in the closed position, as indicated in FIGURE 6.

Chamber 192, for instance, includes a pair of fluid conductive ports 228 and 230. With respect to resolver-receiver chamber 192, fluid connection is completed between this chamber by means of the port 228 to the North actuator 238, as indicated in FIGURE 6, while the fluid port 230 provides fluid communication between chamber 192 and East actuator 256. The North-South distance indicating means comprises a fine distance output wheel 22 which is selectively indexed clockwise by three North actuators 30 identified by numerals 500, 236 and 238. The same North-South fine distance output wheel 22 is indexed selectively in a counterclockwise direction by the three South actuators 26, indicated respectively at 240, 242 and 244. Likewise, as set forth in FIGURE 3, the three East actuators 32 are individually identified by numerals 252, 254 and 256 and selectively drive the East-West fine distance output wheel 24 in a clockwise direction. The three West actuators 28 indicated respectively at 246, 248 and 250 selectively drive the East-West fine distance output wheel 24 in a counterclockwise direction. The method of completing the fluid connections between each of the resolver-receiver chambers is obvious from viewing FIGURE 6 in the manner comparable to that described in connection with the specific resolver-receiver chamber 192.

In the embodiment shown the platform or table 120 is provided with a plurality of sets of fluid actuators responsive to fluid pulse generation and the commutator action of the resolver to incrementally index associated fine distance output wheels. One form of actuator may be best seen by reference to FIGURES 8 and 9. The platform 120 is provided with a series of spaced apertures or openings 258 which act to receive depending tube sections 260 of the actuator support member 262 and form fluid communication means between one of the tubes 270 and a fluid chamber formed by bellows member 272. The bellows member has a pivotable connection 274 at its outer or free end to link 276 which is further pivoted at 278 to a support member 280. The link 276 is provided with a wheel drive friction tang 282 at its outer end. Support member 280 terminates at the inner end in an actuator rod 284 having a threaded adjustable stop nut 286. Rod 284 is received within opening 285 and is slidable therein. With the inner ends of the bellows 272 fixed the fluid pulse generated within shoe 106' passes up through conduit or tube 118' to the resolver director pipe 188 where it passes through an associated resolver-receiver chamber to an associated fluid operated actuator, such as actuator 252, 254 or 256, FIGURE 8. Assuming that the fluid connection is made to actuator 256, FIGURE 9, the outer end of the bellows 272 moves outwardly under the increased pressure causing the link 276 to pivot about pivot point 278 to the extent friction tang 282 contacts the bottom surface of the East-West distance indicating disc 24. Further upward movement of tang 282 is prevented and the bellows 272, upon further expansion due to the increasing pressure as a result of the continued air pulse, causes the actuator rod 284 to slide from right to left with the tang 282 in frictional contact with the bottom surface of the distance indicating wheel 24. The wheel 24 is, therefore, driven, as indicated, in the direction of the arrow 287 an extent determined by the position of stop nut 286 upon the actuator rod 284. The rod 284 and the tang 282 move in unison to the point where the inner surface of the nut 286 contacts the rear surface of the actuator support member 262.

Figure 8:
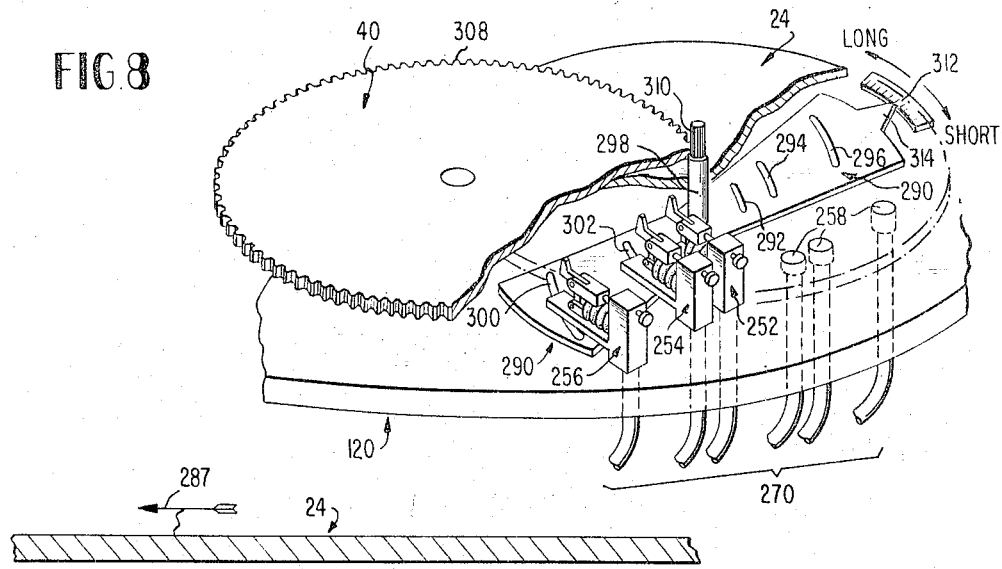

It is obvious from viewing FIGURE 8 that the incremental or index movement of the distance indicating wheel depends upon several factors, one of which is the radial position of the respective actuator, such as 252, 254 or 256 with respect to the center of rotation of the wheel. Further, the distance that the wheel is moved depends upon the spacing between the rear wall of support 262 and the adjustable nut 286. Assuming that this spacing is constant and is fixed for all actuators, then the distance that the wheel moves incrementally during each indexing stroke as a result of pulse operation depends purely upon the radial position of the actuator tang 282 with respect to the axis of rotation of the indicator wheel.

Figure 9:
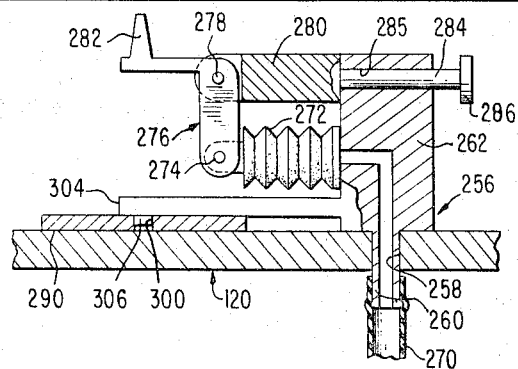

Since the distance that the wheel is to be indexed must be correlated to the stride of the navigation device carrier, means must be provided for adjusting the effect of the constant stroke actuator on the indexing wheel depending upon whether the carrier has a long or short stride, which may possibly depend upon whether or not the man is walking upon hard ground, soft ground, up a steep incline, etc. A simplified stride adjusting means is provided in the present invention through the use of a rotatable plate 290 carrying a series of spaced cam slots. Referring to FIGURE 8, the rectangular plate 290 rotates about the same axis as the fine distance output wheel 24. The plate 290 includes radial cam slots 292, 294 and 296 which are angled forwardly and away from a line drawn longitudinally of the plate 290 and through the axis of rotation. On the opposite side of the post 298 carrying both the distance indicating wheel 24 and the cam plate 290, additional cam slots 300 and 302 are provided respectively for fluid actuators 256 and 254. A third cam slot (not shown) is provided for actuator 252. As indicated in FIGURE 9, the plate 290 rests upon the platform 120. The actuator 256 is provided with a longitudinally extending base section 304, the bottom surface of which is in contact with the upper surface of cam plate 290. A depending tab or cam follower 306 rides within cam slot 300 formed within the plate 290. Upon pivotable movement of the cam plate 290 about the axis of shaft 298, cam follower 306, riding within the cam slot 300, will cause the actuator to rotate about the axis formed by its fluid connection through platform opening 258, thus moving the tang 282 closer to or further away from the axis of rotation of the fine distance indicating wheel 24. It is obvious that the cams 300, 302, etc., are so formed that the oscillation of the plate member 290 about its axis will cause all of the tangs of the respective actuators to fan or move proportionately closer to or further away from the axis of rotation and thus, the radial spacing will be proportionately the same but the tangs will be at different distances with respect to the axis of rotation of the indicator wheel. The radial spacing of the actuators is inversely proportional to desired distance wheel movement per stride pulse. The cam slot geometry is designed so that the relative wheel movements from each actuator remains in the ratio shown by the sine and cosine curves in the pneumatic resolver characteristic chart of FIGURE 7. Reference to FIGURE 8 also shows a possible 1000 to 1 gearing between the fine distance indicating wheel 24 and the coarse indicating wheel 40. This is achieved by fixing wheel 24 to shaft 298 so that it rotates therewith and drives wheel 40 through large gear 308 and pinion 310.

From the above, it is obvious that the resolver director pipe receives the pneumatic pulse from the shoe and transmits it into the resolver-receiver chamber in the azimuth orientation corresponding to the carrier's direction of progress. Each resolver-receiver chamber has two exit ports; one to drive a North-South actuator and one to drive an East-West actuator. Check valves are provided to prevent pressure feedback of the actuation pulses into the other receiver chambers.

The operation of the distance indication actuator are all mechanically similar and have the same actuation stroke. The relative variation in angular travel between actuators, as derived from the sine and cosine curves of FIGURE 7, is obtained by spacing the actuators at the proper radial distances from the center of rotation of the distance wheel. The closer the distance the greater the angular motion produced. Each actuator pivots about its inlet pipe in response to camming action from the "stride adjust" cams, which are preset according to distance/stride of the individual carrying the instrument. Note that the cam slots must maintain the relative sensitivity between actuators, as well as vary the over-all sensitivity of all three actuators. In this regard, reference again to FIGURE 8 shows a fixed series of gauge marks formed on a segmental strip element 312 which is radially spaced from the end of the stride-adjust cam plate 290. A pointer 314, formed centrally of the plate, indicates the relative position of the cam with respect to the stationary graduated scale 312. From the arrows, it is seen that to effect a long stride setting, the cam plate 290 is moved counterclockwise while to effect a short stride setting, the cam plate is moved clockwise. In moving the cam plate clockwise, it is obvious that all three actuators 252, 254 and 256 will rotate or fan about the pipe axis in a clockwise direction, therefore moving the wheel drive tangs radially inward in a proportional manner towards the axis of rotation of the fine distance indicating wheel 24.

Figure 11:
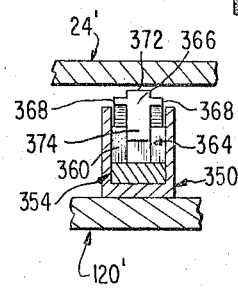
Figure 10:
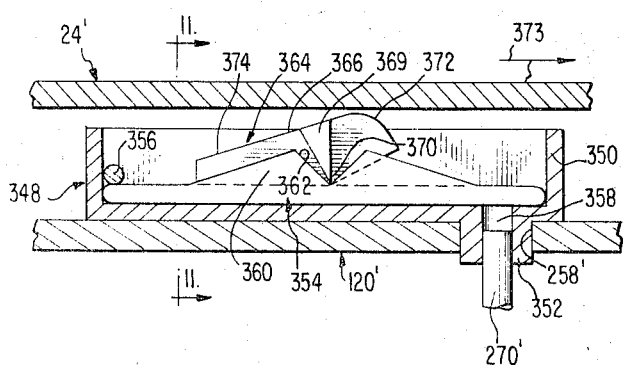
Figure 13:
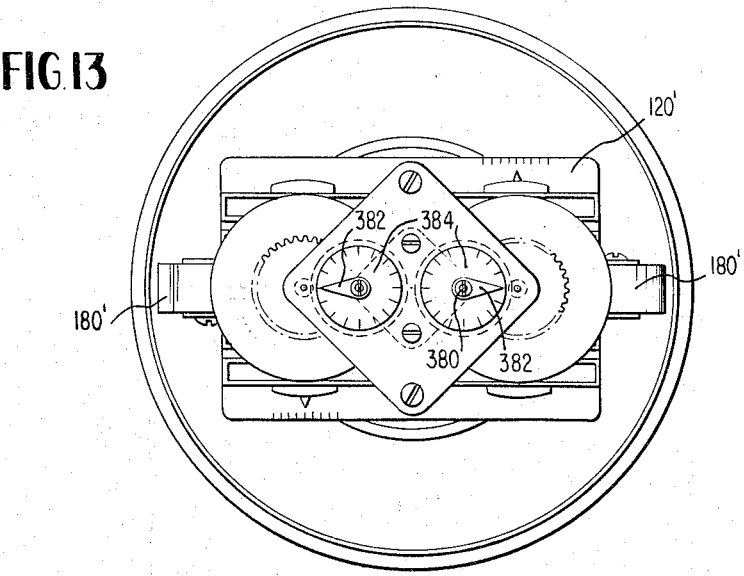
FIGURE 13 is a top plan view of the device shown in FIGURE 12.
Figure 12:
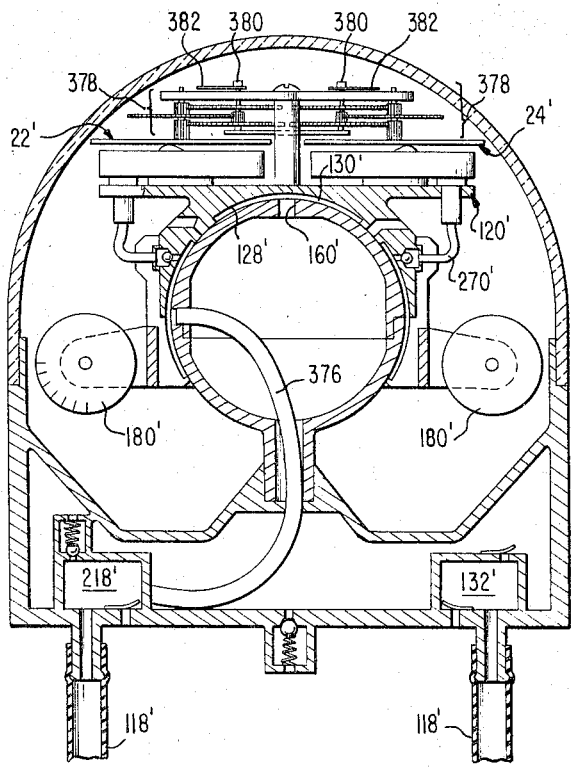

A modified version of the first embodiment is shown in FIGURES 12 and 13 which make use of the same principles of operation but utilizes a slightly different fluid actuator shown in FIGURES 10 and 11. The actuator comprises a rectangular, open top, box or housing 350 which includes a downwardly extending tubular portion 352 extending through an opening 258' formed within the stationary platform 120'. The open box or housing 350 has a rectangular recess which receives a thin rectangular strip-like member 354 which acts as a loosely fitting piston within the box recess. One end of the box is provided with a transversely extending rod 356 which acts to hold down the end of the piston 354 remote from the fluid opening 358 formed by tubular portion 352. Piston 354 is provided with raised sides 360, which are cut away at the center to form a transverse V slot 362.

The third element of the actuator comprises a rocker cam 364. The upper surface 366 of the rocker cam is cruciform in configuration with the arms 368 tapering downwardly to a point at the bottom of the rocker cam, thus forming a knife edge or fulcrum 370 which fits within the V slot 362 of the piston member. This allows limited rocking movement about the pivot point formed by the apex of the side arms 368. From the side view of FIGURE 10, it is seen that the upper rear surface 374 of the rocker cam is relatively fat, while the upper front surface 372 is curved in the form of an involute or a modified involute to provide the desired action in incrementally moving the fine distance indicating wheel 24'.

The operation of the actuator is relatively simple and produces the desired incremental rotation with the distance depending upon the involute curvature 372. In the device shown in FIGURES 10 and 11, the fluid pulse acting on the bottom surface of piston 354 causes the piston to move upwardly, pivoting about the transverse pin 356 and causing the rocker cam to move upwardly until the involute surface 372 contacts the bottom of the wheel 24'. At this point, continued further rocking of the piston 354 upwardly or counterclockwise about pivot pin 356 results in a rolling contact between the involute surface 372 and the bottom surface of the wheel 24'. The rocker rotates about its pivot point 370 to incrementally move the wheel 24' in the direction of the arrow 373 until the flattened rear surface 374 of the rocker cam abuts the bottom surface of wheel 24'. At this point, further incremental movement ceases, and regardless of additional force against the bottom of piston 354, due to continued fluid flow from the resolver, the flattened rear surface 374 remains in abutting contact with the bottom surface of the wheel 24'. Thus, in either the embodiment shown in FIGURE 9, or the embodiment shown in FIGURES 10 and 11, the actuator provides a constant incremental output. With respect to the embodiment of FIGURE 9, the distance is determined by the gap between the threaded nut 286 and the rear surface of the support member 256. With respect to the device shown in FIGURE 10, the distance is completely controlled by the surface configuration of the involute portion 372 of the rocker cam.

FIGURES 12 and 13 show the basic pedometer, pulse operated navigation device in a slightly modified form by the inclusion of piston-rocker cam actuators, such as 348 and 348' mounted upon platform or table 120'. In all other respects, the system is identical although the apparatus employs a simplified valve arrangement for both fluid supply lines 118 and 118'. Rather than the multiple drilled holes in the stem of the previous device, a tube 376 is used. Further, instead of using a simplified gear connection between the coarse and fine indicating wheels, the device is provided with a more complex, triple reduction gear arrangement, whereby three separate 10 to 1 reduction means are employed to provide the coarse, indicator rotation as seen best in the top plan view of FIGURE 13. The gear trains 378 are operatively positioned above the fine distance indicating wheels 22' and 24'. Central shaft 380 supports fixed pointers 382 adjacent the coarse indicating wheels 384. Other than this, the main elements and operational features are identical to the previous embodiment and like numerals are employed with prime marks to indicate the same.

The indexing arrangements, using either the bellows-friction tang form of actuator shown in FIGURE 9 or the rectangular piston-rocker cam form of actuator of FIGURE 10, may be used as a general purpose mechanical integrator or storage element in which the number of pulses is stored as an angular rotation or linear translation. In such devices, the actuators would, therefore, act to incrementally move, at varying distances, either a disc member pivoted about a rotary axis, or a member which is stepped longitudinally in linear fashion. Rotation may be interpreted as either a digital or analog quantity using the proper type of encoder, pickoff, etc. The round piston type of actuator offers an additional modulation variable in that the stroke length is also easily controllable. It is obvious in the FIGURE 9 embodiment, for instance, that the bellows 272 may be replaced by conventional reciprocating piston and cylinder means without changing the method of operation.

With respect to the resolver, in both embodiments, the resolver operates in a "step-wise" manner, since it moves sequentially from chamber to chamber. The pneumatic resolver which forms a subcombination in the navigation device has general application to analog computers and operates effectively in the identical manner even when limited to single axis rotation; that is, when the rotary element is cylindrical (not shown) rather than spherical. In this case, resolver signals may be taken from the rotational element back onto the stationary element through pneumatic (slip rings) or rotating joints. Obviously, the use of pneumatic slip rings and the like are achieved only with difficulty when using cooperating spherical surfaces. In the previous two embodiments, the resolver is used in conjunction with analog distance indicating storage devices, wherein a pulsed vector sum input is automatically separated into vector components and fed individually to vector component analog storage means by variably indexing a storage wheel depending on the vector magnitudes.

Reference to FIGURES 14, 15 and 16 disclosed the third embodiment of the present invention as applied to a man-carried navigation device which generates continuous present position information. Unlike the previous two embodiments which utilize a fluid pulse as a result of step-wise motion of the carrier, the embodiment shown in these figures employs an inertial guidance approach in which North and East oriented integrater accelerometers are mounted on a gas bearing supported, spherical, stabilized platform. The main casing of the instrument indicated at 100" is essentially the same as the casing 100 shown in FIGURE 4 and carried much in the same manner. Instead of having two supply conduits, such as 118 and 118' to supply pressurized fluid, such as air, to the cavity 158' within the spherical support member 122", only one is required. Central, vertically oriented opening 160" provides a suitable connection to gas bearing cavity 130" within main platform section 126" in the identical manner to the previous embodiment. The device shown in these drawings is characterized by the absence of a resolver section; however, platform magnetic azimuth alignment is obtained from permanent magnets affixed to the platform in the same manner as the previous embodiments in which the permanent magnets are aligned to the local earth magnetic field. Vertical alignment is also obtained in the identical manner as shown previously by making the platform pendulous. Present position readout is performed visually through a transparent window or cover (not shown) in the top of the instrument case.

The inertial navigation arrangement uses a variation of the gas-lubricated, double integrating accelerometer (distance meter) disclosed by R. O. Stouffer in copening United States application Serial No. 354,625, filed March 25, 1964, entitled "Acceleration-Sensitive Devices and Systems," assigned to the common assignee. In the aforementioned application, a seismically suspended gas jet impinges radially on a smooth cylinder which is itself suspended on gas bearings. In the presence of acceleration, the seismic suspension allows the gas jet to impinge eccentrically against the wheel, imparting a proportional torque to it. With the extremely low friction gas bearing suspension, the wheel displacement is very nearly analogous to the displacement of the vehicle carrying the instrument. A small deviation from rigorous double integration results from the slight viscous restraint induced by the gas bearing. In designing gas bearings suitable for small, lightweight distance meters, an instrument time constant of about 1000 seconds is practically difficult to obtain and since 1000 seconds is short compared to the operating times of navigation instruments useful to man traveling on foot, it is obvious that the distance meter principle set forth in the Stouffer application requires modification for the present application.

The application of the Stouffer principle to a man-carried navigation device necessarily involves a modification wherein two distance meters are in series, one for each integration to be performed and each configured so that its characteristic time constant is quite short. This is accomplished by increasing the viscous restraint, and minimizing the wheel inertia. Since the resulting instrument scale factor is low, an escapement driven register wheel is added to record the number of revolutions of the second integrator (distance wheel). The escapement senses the distance wheel revolutions and direction of rotation pneumatically to minimize torque disturbances. Since double integration is provided, the time constants for each distance meter should be less than 5 seconds. While it may be difficult to obtain the necessary viscous restraint from the gas bearings, additional viscous restraint may be obtained by magnetic means in which the wheels are fabricated from a material with lightweight and good electrical conducting characteristics, such as aluminum and small permanent magnets (not shown) may be set into the platform close to the wheels so that the wheel intercepts some of the magnetic flux.

Referring to FIGURES 14, 15 and 16, a practical arrangement includes a series of elements positioned within separate North-South channels and East-West channels and operating to incrementally index associated North-South and East-West index distance register wheels 400 and 402 respectively. The operation of each of the inertial indexing mechanisms is identical and reference to FIGURES 15 and 16 shows the North-South channel elements and their method of operation. A North-South seismic assembly 404 includes a seismic or inertial mass 406 suspended by coil springs 408 on pins 410 fixed to the platform 100" for restrained oscillation along a North-South axis. Pressurized fluid may be supplied, for instance, FIGURE 16, from gas bearing cavity 130" through vertical conduit 412, horizontal conduit 414 and flexible hose connection 416 to a cavity 418 within the seismic mass 406. A nozzle member 420 protrudes from one side of the seismic mass 406 and the fluid discharge or jet is directed against the periphery of a first integrator wheel or member 422. Member 422 is supported upon a gas bearing by being positioned within annular recess cavity 424 in fluid communication with horizontal fluid conduit 414 through vertical conduit 426. As such, the annular element 422 is restrained against all movement with the exception of rotation about its axis. Extreme rotation of the first integrator wheel 422 is limited by the provision of a pair of upstanding pins fixed to platform 100", positioned in the path of a radial tab 430. Fluid communciation is further provided between vertical conduit 426 and a second nozzle member 432 which is oriented so as to discharge a jet of fluid horizontally against the periphery of a second integrating wheel 434.

Step-wise movement of the man carrying the navigation device results in oscillation of the inertial or seismic mass 406. With respect to the North-South integration system shown in FIGURE 15, oscillation at right angles to the sensitive axis indicated by the sensitive North-South axis, will have no operative effect on the passage of gas emanating from jet nozzle 420 and impinging upon the periphery of the first integrator wheel 422. However, any step in a direction at an angle thereto will have more or less effect on the quantity of gas distributed on each side of the wheel. For instance, movement along the sensitive axis in either direction will cause maximum oscillation of the sesmic mass 406 from its central or null position causing maximum torque to be imparted to the first integrator wheel to cause maximum rotation in either clockwise or counterclockwise direction from its null position. This results in angular displacement of the nozzle 432 associated with the first integrator wheel from its null position thereby delivering a greater amount of gas to one side of the second integrator wheel 434 than the other. The pins 428 are positioned in the path of the tab 430, but at a distance circumferentially spaced therefrom, which is normally greater than any angular displacement given to the first integrator wheel 422 as a result of step oscillation of the seismic mass 406 about the sensitive axis, and therefore, under normal operation, the radial tab 430 will not contact either of the limit stops 428. It is readily apparent that movement of the carrier for the identical number of steps in opposite directions, that is, 100 steps in the South direction along the sensitive axis and a reversal of 100 steps along along the same axis in the North direction would result in step-wise movement of the second integrator wheel 434 a predetermined angular distance about its axis and return to the start or reference position. The second integrator wheel 434 provides the function of selectively indexing the register wheel 400 one index position as a result of a full 360° rotation of the second integrator wheel 434, as well as controlling the direction of rotation of the register wheel during this single indexing movement.

A fluid logic, bistable device of conventional design senses the polarity or direction of rotation of the second integrator wheel and ensures indexing of the register wheel in the proper direction. Fluid drive means achieve the indexing of the register wheel 400 one index position for each full 360° cycle of rotation of the integrator wheel 434. The fluid logic element 436 which is conventionally known as "fluid flip-flop" is formed by creating the proper fluid paths and geometry within the table base 126", as indicated in FIGURE 16. A constant source of fluid delivered to the flip-flop 436 through horizontal conduit 414, vertical conduit 438 to flip-flop supply port 440. The pressurized fluid flows out of the port 440 into an enlarged, triangular shaped cavity 442 where it is selectively discharged through outlet conduits 444 or 446 depending upon which control port 448 or 450 has last been fluid pulsed. The operation of fluid flip-flops is well known, and are common components in fluid logic systems. In this particular case, the discharge control of the flip-flop through either discharge port 444 or 446 is achieved by the polarity sensing means associated with the second integrator wheel 434. In this respect, clockwise rotation sensing port 456 is provided within the table base 126″ which is in fluid connection with the left hand control port 450 by means of conduit 458. Likewise, a counter clockwise rotation sensing port 452, FIGURE 15, is formed within platform section 126″ on the opposite side of a line directed through the seismic mass. The port 452 is coupled to the control port 448 of the fluid flip-flop 436 by conduit means 454. A constant supply of pressurized fluid is delivered through vertical conduit 460 to an annular recess 462 which also forms a part of the air bearing supporting the second integrator wheel 434. The integrator wheel 434 is, of course, free to pivot about its axis but is restrained from movement other than rotation about the wheel axis. A portion of the pressurized fluid delivered through vertical conduit 460 passes into a U-shaped conduit 464 which rotates with the second integrator wheel 434 about the wheel axis and acts to selectively connect the fluid supply to the polarity sensing ports 452 and 456, as well as a third port 466 which provides an indexing or escapement release pulse through conduit 468 to the pneumatic motor 470. Throughout the full 360° rotation of the second integrator wheel, the pipe 464 is constantly supplied with fluid from the conduit 460 due to the presence of annular recess 462.

For each full cycle of rotation of the second integrator wheel 434, regardless of the direction of rotation, the register wheel 400 is indexed one index position in a direction determined by the polarity sensing means 452 and 456. Further, during the operation of the device, the flip-flop 436 is continuously being supplied with fluid through inlet port 440 which is passing outwardly, either through discharge port 444 or 446. The device is bistable in operation. For instance, assuming that the second integrator wheel is being moved as a result of the pulse operation of the seismic mass 406 in a clockwise direction, as indicated by the arrow on the right of the wheel, the U-shaped pipe 464 will pass over the port 452 such that the discharge end of the pipe 472 and port 452 are in axial alignment. If the bistable device is not already operating such that the fluid is passing from inlet port 440 along the left hand wall of chamber 442, as viewed in FIGURE 16, into discharge port 446, the pulse of fluid delivered to polarity sensing port 452 and carried to the control port 448 of the flip-flop will cause the fluid to flow out of the discharge port 440 and hug the left hand wall discharging fully through discharge conduit 446. As the device continues to rotate in a clockwise direction, the U-shaped tube 464 will next move to a position where a fluid connection is made between pipe discharge port 472 and polarity sensing port 456. A pulse will be delivered to control port 450 causing the fluid path to reverse itself from the left hand wall of chamber 442 to the right hand wall, thus changing the flow of fluid from discharge port 446 to discharge conduit 444. The fluid will continue to flow through the flip-flop from inlet port 440 to discharge conduit 444 even though fluid connection is broken between the rotating pipe 464 and control port 456. Further rotation of the second integrator wheel 434 in a clockwise direction next causes the discharge port 472 of the tube 464 to overlie register wheel escapement actuator or release port 466 delivering a pulse of fluid to the fluid motor 470.

The register wheel is prevented from rotating freely by the convention escapement means 474 including a V-shaped lever 476 having a pair of pawls 478 and 480 at opposite ends. The lever 476 is pivoted at the apex end by means of pin 482 and is carried by platform 100‴, and is biased such that one of the pawls, such as 478 is in engagement with the teeth 484 of the register wheel 400. The escapement actuator motor 470 is of conventional type and may comprise a flexible bellows 486 whose outer end is coupled to a lever 488 which is pivotably connected to the escapement lever 476. The bellows 486 may be biased in the position shown, by a coil spring or the like (not shown) but upon receiving a fluid pulse through conduit 468, the engaged pawl 478 disengages and at the same time pawl 480 engages index wheel 400. The diametric gap between the two pawls 478 and 480 is less than the outside diameter of the register wheel so that at all times one of the pawls 478 or 480 is in engagement with the register wheel teeth 484.

The register wheel 400 is rotatably positioned so that the gear teeth are spaced slightly from ports 486 and 488 with the ports spaced equally on either side of the wheel axis.

The register wheel is incrementally driven one index position as a result of air impingement from either right hand flip-flop discharge port 486 or left hand discharge port 488. The force of the fluid being discharged from the ports is sufficient to rotate the register wheel about its axis upon release of the escapement means 474. Escapement occurs only during the time of alignment of the U-shaped fluid connecting pipe 464, carried by the second integrator wheel 434, and escapement actuator port 466. Pawl 478 releases and pawl 480 engages wheel 400. During further rotation of the integrator wheel in the clockwise direction, the fluid pulse delivered to the escapement actuator motor 470 escapes to the atmosphere through relief port 490 at the time relief port 490 is aligned with the fluid receiving port 466. This allows the spring-biased fluid motor 470 to return to the position shown with pawl 478 engaged with the ratchet teeth 484 and pawl 480 disengaged as shown in FIGURE 15.

The embodiment shown in FIGURES 14, 15 and 16 has been described in conjunction with the specific operation of the seismic mass 406 oscillating about a North-South sensitive axis. The seismic mass 490 which oscillates about an East-West sensitive axis operates in the same manner to incrementally drive the East-West register wheel 402.

All of the previous embodiments heretofore described include hydrostatic gas bearing means for supporting the stabilized platform in a relatively frictionless manner. Reference to FIGURES 17 and 18 indicates an alternative arrangement for the support of the stabilized platform with the support means shown in these figures being applicable to all of the previously described embodiments. In general, the platform 100‴ is suspended on the point of a conical spike which rests in a shallow conical depression. Since the gas bearing has been eliminated, the spherical support member 122‴ instead of being hollow is relatively solid with the exception of a cylindrical recess 600 formed centrally of the spherical section, at the top thereof. The platform 100‴ also includes a cylindrical recess 502 in general alignment with recess 602. Depending from the platform 100‴ is a spike 604, preferably metal, which extends within recess 600, coaxially thereof. The tip of the spike 606 makes contact with the spherical support member 122″ within a shallow, conical depression indicated generally at 608. The conical included angle of the spike is less than that of the depression by at least twice the desired pitch or roll freedom of the platform. By careful control of the spherical radius, indicated by arrow R at the end of the spike, and careful selection of the spike and conical seat materials for bearing strength and low friction coefficient, this alternate suspension method may be made to approach the low friction restrainst of the gas bearing shown in the previous embodiments. In the device shown, as indicated in the enlarged partial section of FIGURE 18, line contact indicated at points 610 is provided between the end of the spike 606 and the walls of the V-shaped recess 608 formed within the spherical support member 122′″. In all other respects, the embodiment of FIGURES 17 and 18 is similar to the basic embodiment of FIGURE 4 in that it employs fluid resolver means including a director pipe 188′″ and resolver segments, such as 192′″ allowing selective delivery of pulsed fluid to actuators (not shown) carried by the top of platform 100′″.

The alternate suspension method using the conical spike offers some practical advantages over the gas bearing approach of the previous embodiments. For instance, the size of the pneumatic resolver is not established by the gas bearing area requirements; hence, the resolver radius may be greatly reduced, thus saving platform weight, and also reducing the leakage area around the periphery of each commutation segment. Further, the platform is better anchored against horizontal displacement, caused by the pressure of each step pulse reacting horizontally between the sphere and the commutator segment. With the gas bearing support, this pressure caused movement allows significant leakage of the step pulse into adjoining commutator segments, and occasionally, the "bottoming" of the sphere against the opposite side of the commutator shell. Additionally, by eliminating the gas bearing, the pneumatic energy requirements of the instrument, already low, are further reduced. Since the gas bearing is supplied by only one foot pump, its elimination obviates the need for the foot pump, thus saving over-all weight, cost, etc.

Referring next to FIGURES 19, 20 and 21, an alternate resolver arrangement is shown which may be substituted for the resolver means shown in the previous embodiments. The spherical support member 122″″ acts to support a platform or table 100″″ by either gas bearing means or the spike and conical suspension system shown in FIGURE 17. The director pipe 188″″ is modified at its exit point by enlarging the exit into a shallow groove 650 along the meridian in the center of each segment about plus or minus 30° from the "equator" of the center spherical support member. At the same time, the chamber area of the chambers, indicated as 652, is reduced to a narrow, equatorial depression which leads through the check valves to the various actuators. This alternate arrangement improves the pneumatic efficiency of the unit in several ways. First, the arrangement significantly reduces the chamber volume; hence, reduces the "parasite" flow for each step of actuation. Further, the arrangement significantly reduces the area of the spherical shell that is pressurized by each step pulse; hence, it reduces the unbalanced force between the center sphere and the resolver shell. Further, the arrangement greatly increases the close clearance spherical surface areas of the inner sphere and resolver shell; hence, reduces the leakage from the active resolver segment to the adjacent segments and/or the upper and lower vent areas. This is so regardless whether the alternate resolver segment geometry is applied to either the gas bearing embodiment or the spike suspension arrangement of the embodiment shown in FIGURES 17 and 18.

The man-carried navigation device in the various embodiments set forth above provides a rather simple, but sophisticated and accurate device which may be constructed from plastic or other lightweight materials, is completely pneumatic and/or mechanical in nature and is relatively inexpensive. Further, the use of the spherical gas bearing, or spike suspension, incorporating the resolver as a part thereof, allows full horizontal stabilization and pitch compensation in which the outer element contains the resolver segments and the inner element contacts the director pipe, which is fixed to the instrument case. The outer element is thus horizontally stabilized by moving its center of gravity slightly below the spherical center and directionally by the addition of the permanent magnets which align themselves and the resolver outer elements to the earth's magnetic field. Dip angle compensation is achieved by adjustably mounting the magnets for pivoting about a horizontal axis. Compensation for man's pitch angle is accomplished by shaping the resolver segments in truncated spherical sectors, whose upper and lower boundaries are plus and minus about 40° in elevation from the horizontal. The hydrostatic spherical gas bearing is characterized by negligible static friction and a low level of viscous friction. By having the indicator wheel indexing mechanism attached directly to the outer element of the resolver, the necessity of transferring the resolver segment outputs from the outer (moving) element back to the stationery element is eliminated. Further, due to the transparent cover, the outputs may be visually read under all reasonable conditions.

The indexing mechanisms are made very light and hence, the additional load on the spherical gas bearing is kept very low. The device is used with a pneumatic power system generated by the man in the actual process of walking. While most of the power is needed to operate the spherical air bearing supporting the magnetic North seeking assembly, the outer portion of the resolver, and the mechanical indexing assemblies, some power is required in generating the "step" pulse. The typical expected flow is in the order of five cubic inches per second at .1 p.s.i. Assuming a pump efficiency of 50%, the input power required of the man is .000152 or .113 watts, which is extremely small energy burden placed upon the user or carrier. Due to the low pressures involved, the system operates satisfactorily with only crude pressure regulation means, such as the simple relief valve. With the low pressures anticipated, the simple flap check valves are practical. Further, light, flexible air lines may be used to interconnect the pumps carried by the operator with the instrument itself. These are clamped, snapped, zipped, etc., to the man's uniform (probably to the rear and side portion of the man's trouser legs for maximum protection.

In addition to the shoe pumps in which the man's weight compresses the bellows type compartments built into or under the shoes which spring back when the weight is lifted, joint-flexing pumps may be used instead which harness the angular motion of man's ankle, knee or hip joints. Obviously, other pumps could be used. For instance, inertial-action pumps which operate on the acceleration of man's foot or lower legs, such as the acceleration when the leg is brought forward for each step. Other obvious man-generated sources of pneumatic power, such as a hand pump and pressure storage vessel may be employed. These, however, require significant monitoring by the user to prevent inadvertent air exhaustion, plus the periodic inconvenience of pumping up the tank. An alternate possibility for generating the step pulse consists in sensing the vertical acceleration of the instrument as the man comes down on each foot in applying the acceleration to trip a pneumatic valve. While the device is shown in FIGURE 1 is supported on the carrier by a belt in which the device is front mounted, alternative supporting means may be employed. For instance, the device could be belt-mounted at the rear, chest mounted, shoulder mounted or helmet mounted.

The man-carried navigation device may be readily adopted for vehicle use by substituting a pneumatic pulse generator, gear driven from one of the wheels for the step pulse generator. Pneumatic power for the gas bearing may be obtained from the same pulse generator; or stored, compressed air, or even vacuum from the vehicle's engine intake manifold. Magnetic compensation for the instrument would probably be necessary due to the proximity of large masses of iron of the vehicle. This compensation could be accomplished by adding small pieces of permanent magnetic material around the instrument case in the manner of compensating magnetic compasses in aircraft.

The inventive concept could likewise be adapted to local water navigation by adopting the movement of a rotary vane type of flow meter to form a pneumatic pulse generator. The flow meter movement would be mounted with its inlet forward, its outlet aft, and would thus sense vehicle forward progress as a function of the volume of water passing through it.

The instrument is primarily constructed for plastic and for low cost manufacturing, the elements may be injection molded. Plastic gears, fasteners, valve details may be used to minimize weight and corrosion problems. Pneumatic printed circuit techniques and/or flexible plastic tubing may be employed for forming the pneumatic interconnections between the resolver segments and the actuators. The North seeking magnets are preferably ceramic being somewhat lighter than the Alnico type.

As mentioned previously, the instrument has three lightly damped oscillatory modes; one associated with the magnetic torque restrain-azimuth inertia and one each associated with the pendulous torque restraint-pitch and roll inertias. The instrument parameters are chosen so that the frequencies of these modes are significantly separated to avoid resonant coupling. Since the viscous restraint of the air bearings is very low, inter-mode coupling is relatively unimportant. It is also important to separate the pendulous modes from one of the two prime driving frequencies in the system; specifically, the step frequency. The step frequency tends to excite the pendulous modes through the horizontal accelerations of "man's body as he takes each step." It is necessary, therefore, to separate oscillatory modes from driving frequencies by factors of 5 to 10 to avoid resonant oscillation buildup. Hence, if the step frequency is about one cycle per second, the nearest pendulous mode should be .2 to .1 cycle per second to minimize oscillation buildup. By careful "tuning" the magnetic mode frequency with respect to the step pulse frequency (half the step frequency), a controlled moderate level of oscillation is achieved in order to optimize the error averaging process.

While the invention has been particularly shown and described with reference to preferred embodiments thereof, it will be understood by those skilled in the art that the foregoing and other changes in the form and details may be made therein without departing from the spirit and scope of the invention.

What is claimed is:

1. A pulse force operated navigation device comprising: a support member, a platform, means for mounting said patform from said support member for relative free movement about at least the vertical axis, means for generating pulses in response to the movement of said device with respect to a reference point, means carried by said plaform tending to continually align said platform with the earth's magnetic field, a distance indicating member, means for positioning said member for relative movement with respect to a stationary reference, means responsive to each pulse for incrementally moving said distance indicating member, and means responsive to the direction of movement of said device with respect to said magnetic field for modifying the extent of said incremental movement, said last means including resolver means formed between said support member and said platform.

2. The navigation device as claimed in claim 1 further including at least one permanent magnet positioned on said platform whereby the South pole of said permanent magnet points in the direction of the earth's magnetic North pole.

3. The device as claimed in claim 2 further including means for adjusting the angular position of said permanent magnet about said vertical axis to calibrate said device to true geographic North.

4. The device as claimed in claim 3 further including means for aligning said permanent magnet for the local dip angle of the earth's magnetic field.

5. The device as claimed in claim 1 wherein said means for mounting said platform comprises: a spherical support member, a spherical recess formed within the bottom surface of said platform, means for positioning said platform on said spherical support member and for maintaining a layer of pressurized fluid between said platform and said spherical member thereby permitting limited universal, relatively frictionless movement between said platform and said spherical supporting member.

6. The device as claimed in claim 5 wherein said pulse force operated navigation device is man-carried and wherein said device further includes means responsive to ambulatory movement of said carrier for both supplying said pressurized fluid to said fluid bearing and for creating said pulses.

7. The device as claimed in claim 6 wherein said man-carried means responsive to ambulatory movement creates a pulse as a result of each step in any direction.

8. The device as claimed in claim 1 wherein said means for mounting said platform comprises: a support member including a shallow conical recess, and an elongated spike having one end fixed to the bottom of said platform and its other end positioned within said conical recess wherein line contact is achieved between said spike and said conical recess to provide maximum stability, with minimum static and kinetic friction.

9. The device as claimed in claim 8 wherein said other end of said spike has an included conical angle less than that of the depression by at least twice the desired pitch or roll freedom of the platform.

10. The device as claimed in claim 1 wherein said distance indicating member comprises a wheel positioned upon said platform for rotation about said wheel axis, said apparatus further includes a plurality of mechanical actuating means for incrementally moving said wheel, means for maintaining output movement of each actuator constant, and means for selectively positioning said actuators radially of said wheel axis correlated to the direction of movement of said operator with respect to said magnetic field.

11. The device as claimed in claim 10 further including means for simultaneously varying the distance of said actuators with respect to said disc axis whereby the incremental rotation of said disc is correlated to the length of stride of the carrier.

12. A pulse force operated navigation device comprising: a platform, means for mounting said platform for relative free movement about at least a vertical axis, means carried by said platform tending to align said platform with the earth's magnetic field, a pneumatic resolver including a series of pneumatically isolated, resolver-receiver chambers spaced circumferentially about the axis of said platform and carried thereby, a single pneumatic resolver director pipe fixedly oriented in the direction of movement of said device and positioned for selective communication with said chambers, a distance indicating member, means for positioning said member on said platform for relative movement thereto, pneumatic pulse responsive means selectively coupled to associated resolver-receiver chambers and responsive to fluid connection between said resolver director pipe and said pulse source for incrementally moving said distance indicating member, and means responsive to the direction of movement of said device with respect to said magnetic field for modifying the extent of said incremental movement.

13. A pulse force operated navigation device comprising: a platform, means for mounting said platform for relative free movement about at least a vertical axis, means carried by said platform tending to align said platform with the earth's magnetic field, a distance indicating member, means for positioning said member on said platform for relative movement thereto, an air jet supplied with fluid pulses in response to movement of said device in any direction, a plurality of fluid actuators positioned on said platform in operative relation to said distance indicating member for incrementally moving said member varying distances and means for selectively coupling said air jet and said actuators depending on the relative angular position of said jet with respect to said magnetic field whereby said distance indicating member is moved incrementally a distance depending upon the direction of movement of said device with respect to said magnetic field.

14. The device as claimed in claim 13 wherein said distance indicating member comprises a wheel positioned for free rotation about said axis, said device further comprising means for radially positioning said fluid actuators at varying distances with respect to said axis of wheel rotation correlated to said air jet selective coupling means.

15. A navigation device comprising: a platform, means for mounting said platform for relative free movement about at least a vertical axis, means carried by said platform tending to align said platform with the earth's magnetic field, an unrestrained symmetrical rotor mounted for rotation about a central axis, a resilient deflectable member positioned adjacent said rotor on said platform for deflection from a null position by acceleration forces about at least one axis transverse to the axis of rotation of said rotor, force exerting means carried by said deflectable member for inducing a torque about the axis of said rotor proportional to the displacement of said deflectable member from said null position along said one axis whereby the extent of angular rotation of said rotor about said rotor axis is indicative of the extent of movement of said navigation device relative to a reference point and its direction of movement with respect to the earth's magnetic field.

16. The device as claimed in claim 15 further including a distance indicating member, means for sensing the direction of rotation of said rotor for determining the direction said distance indicating member is to be driven, and means responsive to a full rotation of said rotor for indexing said distance indicating member one index position in said predetermined direction.

17. The device as claimed in claim 15 wherein said force exerting means carried by said deflectable member comprises a fluid nozzle, and means for supplying pressurized fluid to said nozzle whereby said rotor is driven about said rotor axis as a result of deflection of said nozzle from a position aligned with said central axis.

18. The device as claimed in claim 17 wherein said pulse driven rotor includes a source of fluid pressure positioned eccentrically of the axis of rotation of said rotor, a distance indicating member, first fluid receiving means positioned in the path of eccentric fluid source for determining the direction of rotation of said rotor, second fluid receiving means positioned in the path of said eccentric fluid source for allowing indexing of said distance indicating means one index position, means responsive to said rotor direction sensing means tending to drive said indicating means in a corresponding direction, and means responsive to a desired angular rotation of said rotor for allowing said distance indicating member to be indexed one position in said predetermined direction.

19. The device as claimed in claim 15 further including a source of fluid pressure, polarity sensing means including a fluid bistable device, means for connecting said fluid pressure to said fluid bistable device to selectively deliver pressurized fluid to one of two discharge ports, a distance indicating member, means for positioning said distance indicating member in proximity to said ports to be selectively driven in either of two directons, means normally preventing movement of said distance indicating member, and means responsive to predetermined rotation of said rotor for momentarily releasing said distance indicating member whereby said distance indicating member is indexed in a direction determined by said polarity sensing means.

20. A navigation device comprising: a platform, means for mounting said platform for relative free movement about at least a vertical axis, means carried by said platform tending to align said platform with the earth's magnetic field, a first unrestrained symmetrical rotor for rotation about a central axis on said platform, a second unrestrained symmetrical rotor mounted for rotation about a central axis on said platform but displaced longitudinally of said first rotor, a resilient deflectable member positioned adjacent said first rotor and mounted for deflection from a null position by acceleration forces along at least one axis transverse to the axis of rotation of said first rotor, force exerting means carried by said deflectable member for inducing a torque about the axis of said first rotor proportional to the displacement of said deflectable member from said null position along said one axis, a second force exerting means carried by said first rotor for inducing a torque about the axis of said second rotor proportional to the angular displacement of said first rotor, whereby the angular rotation of said second rotor is indicative of both the extent of movement of said device with respect to said magnetic field and the direction of movement thereto over extended periods of time.

21. A fluid operated, frictionless resolver comprising: a stationary supporting member, a movable member supported on said stationary member for rotation about one axis thereof, a source of pressurized fluid, means including said pressurized fluid forming a frictionless fluid bearing between said stationary and said movable member, a series of isolated, fluid receiving chambers carried by one of said members with said chambers being positioned circumferentially about the axis of rotation of said movable member, means responsive to rotation of said rotary element from a reference position with respect to said stationary element for selectively completing fluid communication between said fluid source and said chambers whereby fluid communication to any one of said chambers is indicative of the angular deviation of said rotary element from a reference position.

22. A fluid operated resolver comprising: a generally spherical support member, a platform member carried by said spherical support member having a spherical recess formed therein and overlying said spherical support member, one of said members being adapted to rotate about a common axis passing through both of said members, a source of fluid carried by one of said members, a series of spaced, fluid isolated, fluid receiving chambers carried by said other member with said chambers being positioned circumferentially about the axis of rotation whereby relative movement of said one member about said axis of rotation with respect to said other member results in selective fluid communication between said fluid source and said chambers.

23. The resolver claimed in claim 22 wherein said spherical support member carries said source of fluid and includes an outlet directed at right angles to the axis of rotation, means including a shallow groove disposed along the meridian in the center of said spherical support member and extending above and below the equator of said spherical support member in the order of 30° and whereby in said fluid receiving chambers comprise narrow, equatorial depressions for minimizing parasite flow during step actuation as a result of angular deviation of one member with respect to said other member.

24. A system for integrated analog storage of vector components resulting from fluid pulse vector sum input comprising: a first relatively fixed member, a second member mounted for free rotation about its axis adjacent said first member, means tending to orient said second member in a preferred angular reference position, fluid pulse delivery means carried by one of said members, a series of isolated, fluid receiving chambers carried by said other member and spaced circumferentially of said axis of rotation, means responsive to deviation of said second member from its reference position for selectively coupling said pulse delivery means and one of said fluid receiving chambers, movable, vector component analog storage means, a plurality of fluid actuators operatively positioned with respect to said movable vector component analog storage means, means for coupling said fluid receiving chambers to respective actuators, and means for correlating the position of said actuators with respect to said movable storage means whereby said storage means is incrementally moved as a result of pulse delivery, a distance which depends upon the number of pulses delivered and the angular position of said second member from said preferred angular reference position.

25. A fluid operated incremental drive system comprising: a stationary support member, an actuator rod mounted on said stationary support member for limited longitudinal movement thereto, an L-shaped lever pivotably mounted at the end of said actuator rod, a tang fixed to one end of said lever for frictional engagement with said distance indicating member, a bellows member fixed at one end to said support member and pivotably connected at the other end to the other end of said L-shaped lever, and means for supplying a fluid pulse to said bellows whereby said L-shaped lever is initially rotated, until said tang contacts said distance indicating means, whereupon said actuator rod and said tang are moved longitudinally to incrementally index said distance indicator member a distance determined by the longitudinal movement of said actuator rod.

26. A pulse operated digital-to-analog converter for storing vector sum pulse inputs as analog vector components comprising: a first member mounted for relative free movement about a rotary axis, means carried by said member tending to align said member at a predetermined angular reference position, a pneumatic resolver including a series of pneumatically isolated resolver-receiver chambers spaced circumferentially about the axis of said member and carried thereby, a pneumatic resolver director pipe oriented in the direction of said vector sum and in fluid connection with said pulse producing means, at least one vector component analog storage member, means for positioning said storage member on said support for relative movement thereto, pneumatic pulse responsive means coupled to associated resolver-receiver chambers and operatively positioned with respect to said storage member such that said storage member is moved incrementally in response to each pulse a distance correlated to the angular deviation of said resolver director pipe from said reference position.

27. A pulse operated digital-to-analog converter for storing vector sum pulse inputs as analog vector components comprising: a platform, means for mounting said platform for relative free movement about one axis, means carried by said platform tending to align the platform in an angular reference position, at least one seismic mass mounted on said platform for deflection from a null position about a sensitive axis by pulse acceleration forces, an unrestrained symmetrical rotor mounted for rotation about a central axis adjacent said deflectable member, and force exerting means carried by said deflectable member for inducing a torque about the axis of said rotor proportional to the displacement of said deflectable member from said null position along said one axis whereby the extent of angular rotation of said rotor about said rotor axis is indicative of the extent of movement of said platform relative to said reference position as well as the direction of movement thereto.

28. A fluid pulse operated incremental actuator for indexing a movable member, comprising: an open ended piston supporting member fixedly positioned with respect to said movable member with the open end spaced slightly therefrom, a thin, piston member freely positioned within said opening, means restraining upward movement of said piston member at one end of said piston, means for directing a fluid pulse against the bottom of said piston member to oscillate said piston about said pivot point, a rocker cam, means for positioning said rocker cam on said piston for limited rocking thereto, means forming an involute along the upper surface of said rocker cam, whereby fluid pulsing of said actuator results in contacting said rocker arm and said movable member and rotation of said rocker cam on said piston to move said movable member incrementally a constant distance determined by the involute configuration regardless of the maximum duration of pulse pressure exerted against said piston.

29. The device as claimed in claim 28 wherein said rocker member is of cruciform plan configuration including tapered arms forming a fulcrum at the bottom on either side thereof, and said piston includes a pair of raised edges having a central V slot for receiving the fulcrum side of said rocker cam.

30. A fluid operated actuator for indexing a movable distance indicating member a constant maximum distance, comprising: a relative fixed support member, a receiprocating actuator rod, means for mounting said rod on said support member for limited axial movement relative thereto, a lever member pivoted to the end of said actuator rod including a wheel drive tang positioned to engage said movable distance indicating member, and a fluid motor connected to said lever member for first pivoting said tang into contact with said distance indicating means and secondly for moving said distance indicating member an incremental distance determined by the movement of said actuator rod.

31. A fluid operated resolver for indicating the angular deviation of a movable element mounted for rotation about its axis with respect to a stationary element comprising: means for effecting an air bearing relationship between said elements, a source of fluid carried by one of said elements, and a series of isolated fluid receiving chambers carried by said other element, said chambers being positioned circumferentially about the axis of rotation of said movable element, whereby said chambers are in selective fluid communication with said fluid depending upon angular deviation of said movable element from a reference position.

32. A fluid operated resolver for indicating the angular deviation of a rotary element mounted for rotation about its axis with respect to a stationary element comprising: a stationary element having a spherical supporting surface, a rotary element including a cooperative spherical recess positioned upon said stationary element for rotation about its axis with respect to said stationary element and forming a fluid bearing cavity with respect to said stationary element, means for supplying fluid under sufficient pressure to said cavity to effect an air bearing relationship between said stationary element and said rotary element, a source of fluid carried by one of said elements, and a series of isolated, fluid receiving chambers carried by said other element, said chambers being positioned circumferentially about the axis of rotation of said rotary element, whereby said chambers are in selective fluid communication with said fluid depending upon angular deviation of said rotary element from a reference position.

33. The device as claimed in claim 32 wherein said isolated, fluid receiving chambers are formed within said spherical recess of said movable member adjacent said air bearing cavity.

34. A fluid operated resolver for indicating the angular deviation of a movable element mounted for rotation about its axis with respect to a stationary element comprising: a source of fluid carried by one of said elements, a fluid discharge nozzle coupled to said stationary element in line with the horizontal axis of said stationary element and connected to said source of fluid, a series of isolated, fluid receiving chambers carried by said other element, said chambers being positioned circumferentially about the axis of rotation of said movable element, whereby said chambers are in selective fluid communication with fluid emitted from said nozzle depending upon angular deviation of said movable element from a reference position, and means for effecting fluid communication between said nozzle and said chambers throughout an angular deviation of said movable element with respect to said stationary element of 30 degrees from horizontal in either direction.

35. A position indicating device comprising: a support frame, a member mounted for substantially free movement relative to said frame about at least the vertical axis, means for generating pulses in response to the movement of said device with respect to a reference object, means carried by said member tending to continually align said member with the earth's magnetic field, a distance indicating member, means for positioning said distance indicating member for relative movement with respect to a stationary reference, means responsive to each pulse for incrementally moving said distance indicating member, and means responsive to the direction of movement of said device with respect to said magnetic field for modifying the extent of said incremental movement, said last means including resolver means formed between said frame and said member.

36. The device of claim 35 wherein said pulse force operated navigation device is man-carried and wherein said device further includes means responsive to ambulatory movement of said carrier for generating said pulses.

37. A fluid operated resolver for sensing the angular displacement of a rotary element with respect to the earth's magnetic field comprising: a circular element magnetically oriented with respect to the earth's magnetic field, a rotary element positioned with respect to said first element for rotational movement relative thereto, a source of fluid carried by one of said elements, and a series of isolated, fluid receiving chambers carried by said other element, said chambers being positioned circumferentially about the axis of rotation of said rotary element, whereby said chambers are in selective fluid communication with said fluid depending upon angular deviation of said rotary element from the earth's magnetic field.

References Cited

UNITED STATES PATENTS

| | | | |
|---|---|---|---|
| 709,313 | 9/1902 | Ferguson | 235—105 |
| 1,101,128 | 6/1914 | Benson et al. | 73—178 |
| 1,427,267 | 8/1922 | De Lavaud | 33—1 |
| 2,022,275 | 11/1935 | Davis | 73—178 X |
| 2,406,836 | 9/1946 | Holden | 73—178 |
| 3,081,942 | 3/1963 | Maclay | 340—347 |
| 3,202,179 | 8/1965 | Vockroth | 137—624.14 |
| 3,202,180 | 8/1965 | Gray | 137—625.15 |
| 3,260,485 | 7/1966 | Lerman et al. | 73—178 |

FOREIGN PATENTS

| | | |
|---|---|---|
| 772,446 | 4/1954 | France. |

OTHER REFERENCES

IBM Technical Disclosure Bulletin, vol. 3, No. 5, page 16, October 1960.

LOUIS R. PRINCE, *Primary Examiner.*

N. B. SIEGEL, *Assistant Examiner.*